Figure 4:
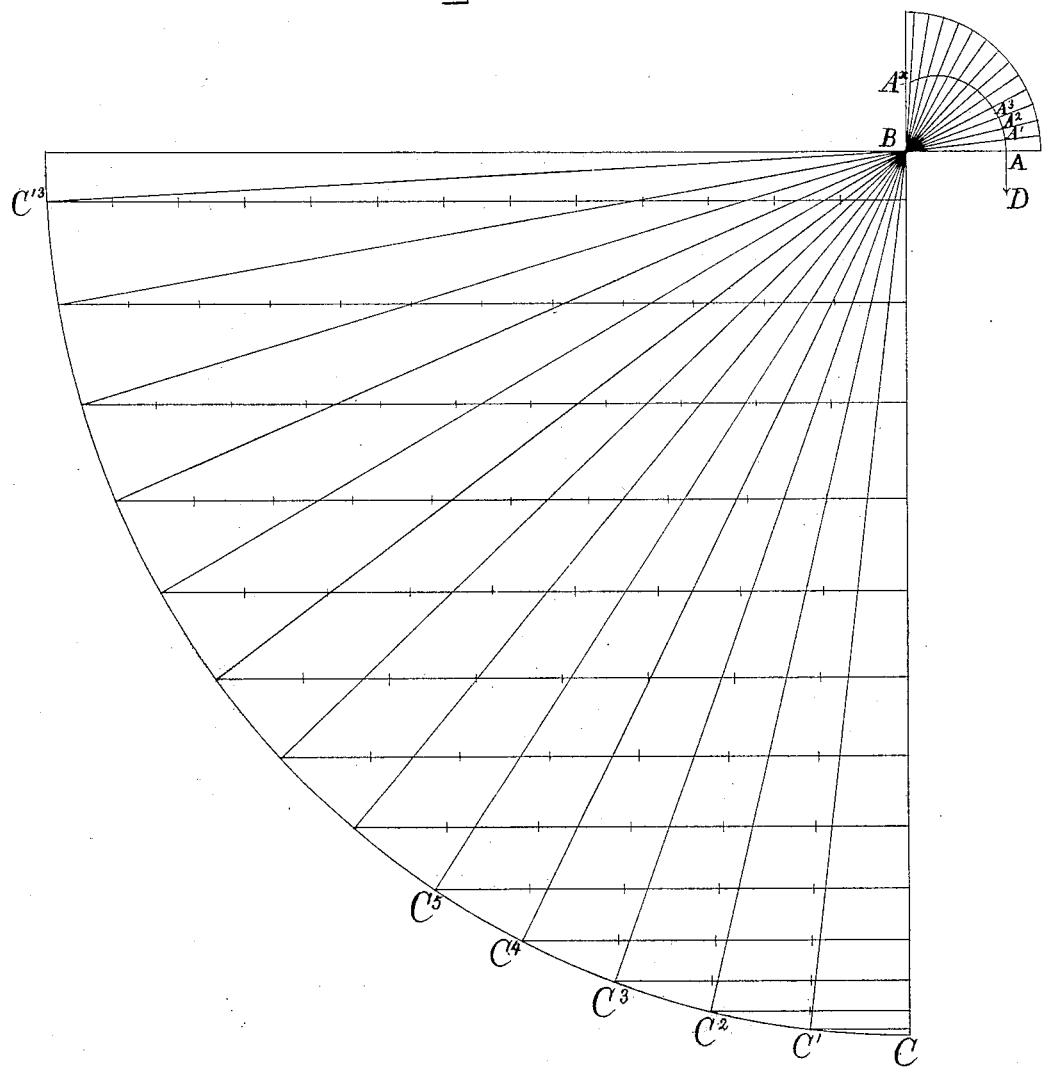

2 Sheets—Sheet 1.
C. JENSEN.
Weighing Apparatus.
No. 221,826. Patented Nov. 18, 1879.
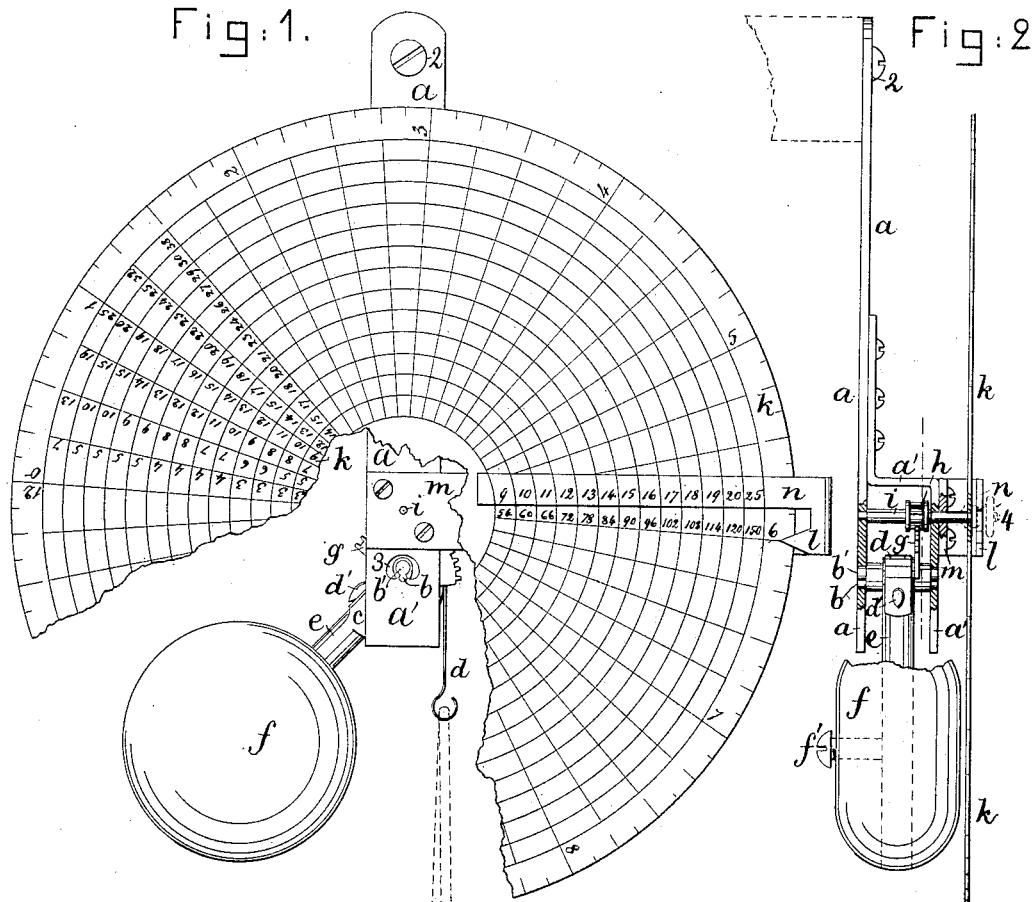
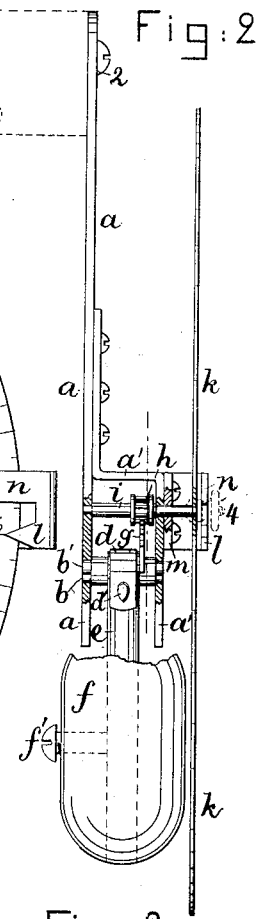
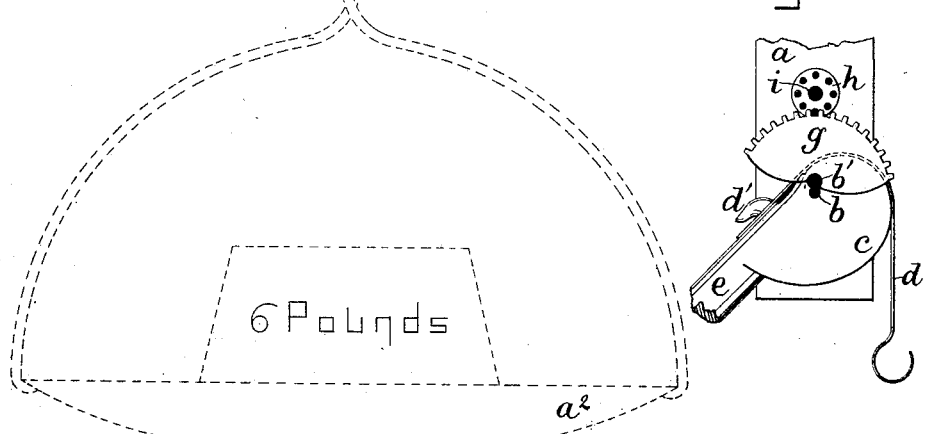
Witnesses.
Jos. P. Livermore
L. F. Connor
Inventor.
Conrad Jensen.
by Crosby & Gregory Atty

UNITED STATES PATENT OFFICE.

CONRAD JENSEN, OF DEDHAM, MASSACHUSETTS.

IMPROVEMENT IN WEIGHING APPARATUS.

Specification forming part of Letters Patent No. 221,826, dated November 18, 1879; application filed September 6, 1879.

*To all whom it may concern:*

Be it known that I, CONRAD JENSEN, of Dedham, county of Norfolk, State of Massachusetts, have invented an Improvement in Weighing Apparatus, of which the following description, in connection with the accompanying drawings, is a specification.

My invention relates to apparatus for weighing, and is embodied in a balance provided with a pan supported by means of a flexible cord or strap adapted to be wrapped or wound about a counterpoised spiral or cam-shaped drum, the article to be weighed, when placed in said pan, turning the drum and lifting the counterpoise more or less in the arc of a circle, the counterpoise rising more or less toward a horizontal position, according to the weight in the scale-pan. Attached to the same arbor with the spiral or cam-shaped drum is a segmental gear engaging a pinion upon a spindle, to which is attached a figured disk graduated at its edges to represent weights, as pounds and fractions thereof, or other desired weights.

A fixed pointer attached to the frame-work of the weighing apparatus indicates upon the graduated disk the weight of the article being weighed as the disk and spiral or cam-shaped drum are turned by the said article in the scale-pan or other usual support upon which articles to be weighed are placed.

An arm fixed with relation to the disk and frame-work is extended from the pointer at the periphery of the disk inward toward the center thereof, and upon it are marked figures to represent the prices per pound or other unit of weight of the articles commonly weighed, and the disk is marked out with figures arranged radially from near the center of the disk to the different weight-indicating divisions of the periphery, said figures on the disk forming a series of concentric circles in line with the figures on the rigid arm, each of said disk-numbers representing the total value of the weight indicated at the end of the radial line at the price indicated by the figure opposite it on the fixed arm, which we may call the "price-arm." The device thus indicates at a glance the weight and value of the article.

A peculiar form of periphery is required for the spiral or cam-shaped drum, in order that the disk may turn through equal arcs for equal addition of weight, as will be hereinafter fully described.

Figure 1 is a front view of my improved weighing apparatus, part of the disk being broken away to show the parts behind it; Fig. 2, a side view thereof; Fig. 3, a detail showing the cam-shaped drum and connected mechanism; and Fig. 4, a diagram showing the method of laying out the curve for the periphery of the cam-shaped drum.

The frame $a\ a'$ is provided near the upper part with screw-holes 2, or other suitable means to enable it to be attached firmly to some larger frame-work, or to a portion of the building or counter where it is to be used, and its lower portion has suitable bearings for the arbors of the cam-shaped drum and disk.

The arbor $b$ of the cam-shaped drum $c$ is shown as a small spindle re-enforced or strengthened by the stouter rod $b'$, this form giving great strength with very small friction, and causing it to keep always in one place, which a knife-edge on a plane surface, as commonly used, would not do.

The metal of the frame $a\ a'$ is cut away, as at 3, above the bearing $b\ b'$, to permit the arbor to turn for the proper distance.

The scale-pan $a^2$, or other suitable means— as, for instance, a hook for holding or supporting the article to be weighed—is suspended upon a flexible cord or strap, $d$, herein shown as a thin metallic ribbon, connected at one end, as at $d'$, with and adapted to be wrapped more or less around the cam-shaped drum $c$, in such a manner that it always rests in contact with the upper portion of the drum, and passes therefrom in a vertical line tangent thereto.

Attached to the drum $c$, or forming a part thereof, is a rigid arm or beam, $e$, adapted to sustain the counterpoise $f$, which in its normal condition, with the scale-pan empty, hangs nearly vertically down; but when the suspending-ribbon is pulled by a weight in the scale-pan, the said drum is turned, the arm is vibrated, and the counterpoise is elevated, the arm $e$ moving in a direction to approach more or less a horizontal position, it, by reason of its increasing leverage as it rises from its vertical position, requiring more or less weight on the pan or strap to move it. Consequently the higher the arm and weight are elevated the greater the weight of the article.

The counterpoise $f$ may be secured to the arm $e$ by a set-screw, $f'$, the arm passing through a hole in the counterpoise, thus admitting of ready adjustment when required.

Attached to the arbor $b$, and turning therewith, is a segmental gear, $g$, which engages the pinion $h$ on the arbor $i$, which carries the disk $k$, said disk being preferably attached to the arbor by a thumb-screw, as shown in dotted lines at 4, Fig. 2, so that other disks with different figures may be readily substituted, if desired.

The disk $k$ is graduated at its periphery to represent the desired units of weight and their fractions, here shown as pounds and eighths, and a fixed pointer, $l$, attached to the framework, indicates by the graduations opposite to it upon the disk the amount of the weight in the scale-pan by which the disk is rotated through the suspending-ribbon $d$ and intermediate connections.

The pointer $l$ is herein shown as formed upon an arm, $m$, attached to the frame $a'$ near the center of the disk, and passing behind the disk to its edge, where it is bent around the said edge, and a portion, $n$, is extended back in front of the disk to near its center, as in Fig. 1. This arm $n$, which I call the "price-arm," is divided into suitable divisions, which are marked with figures to represent the price per unit of weight or per pound of the articles most commonly sold; and upon the disk $k$ is a series of concentric circles corresponding to the divisions of the price-arm, on which, in radial lines, are placed numbers, some of which are shown in Fig. 1, running from the center of the disk to the divisions at its edge, said numbers representing, respectively, the price of the article weighed, its weight being indicated by the figure at the end of the disk, at the rate or price—say, per pound—represented by the figures opposite to them upon the price-arm.

To illustrate the operation of the apparatus, it will be supposed that the scale-pan (shown in Fig. 1) sustains a weight of six pounds, which is indicated by the figure 6 upon the edge of the disk $k$ opposite the pointer $l$. If, for example, the price of the article is fourteen cents per pound, we look opposite the figure 14 on the price-arm and find the number 84, which is the price of six pounds at fourteen cents per pound. This forms a very ready means of telling the cost of an article, and with this apparatus there is very little possibility of making mistakes.

Referring to Fig. 4, I will explain the method of laying out the curve for the drum $c$.

It will be seen that the connection between the scale-pan and its load and the counterpoise forms a bent lever, which may be represented by the line A B C, A representing the point of application of the weight of the article to be weighed, or the tangent point of the suspending-ribbon $d$, Figs. 1 and 3; B representing the fulcrum or spindle $b$, Figs. 1 and 3; and C the center of gravity of the counterpoise.

The points $C^1$ $C^2$, &c., represent the positions taken by the counterpoise as successive weights are added in the scale-pan, and the horizontal lines ending in those points represent the effective length of the lever-arm of the counterpoise in the successive positions indicated by the said points. It will be seen that these lever-arms do not have a uniform increment for equal arcs passed over by the counterpoise, but vary as the sines of the total angles passed over.

It is desirable that the graduations on the disk should be uniform, and consequently that the counterpoise should pass over equal arcs for equal increments of weight in the scale-pan, and consequently the effective length of the short arm of the lever A B C (represented by the lines B A, B A', &c.) must vary in proportion to those of the counterpoise, (represented by the horizontal lines $C'$ $C^2$, &c.)

For convenience, the counterpoise and empty scale-pan may be assumed to weigh one pound each, and that they then will hang in the position A B C', and the line A' B, which will be drawn by the weight of the empty scale-pan to the horizontal position coinciding with A B, may be taken equal to the horizontal line $C'$. If, now, we add one pound in the scale-pan, the counterpoise will move to $C^2$, and the line B A$^2$ will become horizontal, and we shall have two pounds at A$^2$ to balance one pound at $C^2$, or, by the well-known mechanical law, the line B A$^2$ must equal one-half the horizontal line $C^2$. From like reasoning it will be seen that the lines B A$^2$, B A$^3$, B A$^4$, &c., must be respectively one-half, one-third, one-fourth, and so on, the horizontal lines $C^2$ $C^3$ $C^4$, &c., and thus the outline A A$^\times$ for the drum is obtained.

As herein shown, the ratio of teeth in the gear $g$ and pinion $h$ is such that the disk $k$ makes a complete revolution for an oscillation of the counterpoise through a little less than a quadrant. By changing the position of the counterpoise on its arm and substituting a new dial a different range of weight may be given, if desired.

It is obvious that the pointer might revolve and the dial be stationary without departing from my invention; also that two or more price-arms might be used on different sides of the center of the disk; and the gears may be so arranged that the disk may turn less than a whole revolution in the full oscillation of the counterpoise.

I am aware that a fixed and a revolving disk have been used in weighing apparatus to calculate the total value of articles weighed.

It is obvious that two or more drums may be used of different size, to thereby give different ranges of weight, according to the size of the drum to which the scale-pan is attached.

I claim—

1. The described weighing apparatus, consisting of a rotating graduated disk and its fixed price-arm and pointer, in combination with the cam-shaped drum, its counterpoise, and suspended pan, the drum-arbor composed of a small bearing-spindle and an upper re-enforcing rod, a segmental gear, an engaged pinion, and the disk-shaft, all substantially as shown.

2. The cam-shaped drum, its re-enforced arbor $b\ b'$, and cut-away bearings 3 therefor, in combination with weight supporting and indicating mechanism, substantially as shown and described.

3. In a weighing apparatus, a pivot formed, as described, of a double pin, having a lower portion of small diameter re-enforced by an upper portion of larger diameter, as and for the purpose specified.

In testimony whereof I have signed my name to this specification in the presence of two subscribing witnesses.

CONRAD JENSEN.

Witnesses:
   CHAS. E. HIBBARD,
   JOS. P. LIVERMORE.